April 28, 1931.   L. G. GATES   1,802,810
DRAW WORKS BRAKE
Filed May 20, 1930
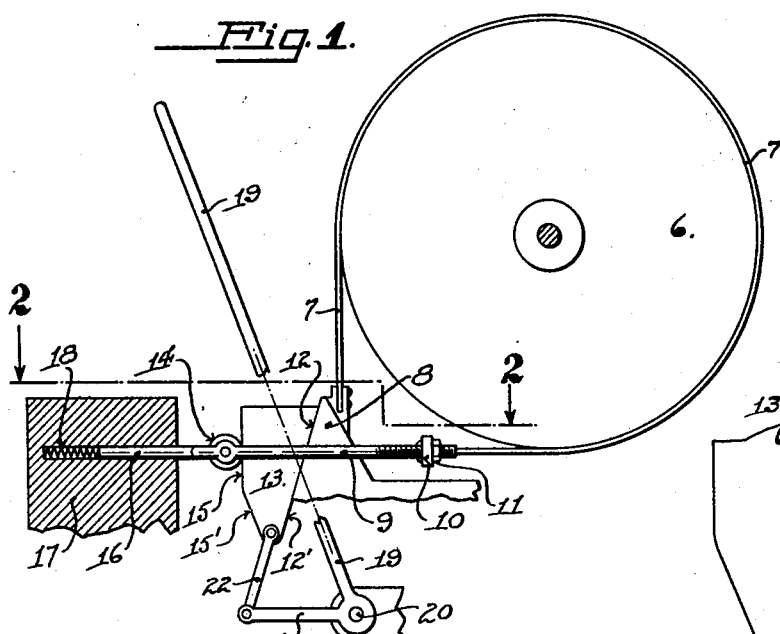
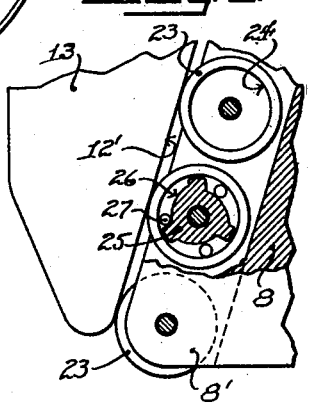
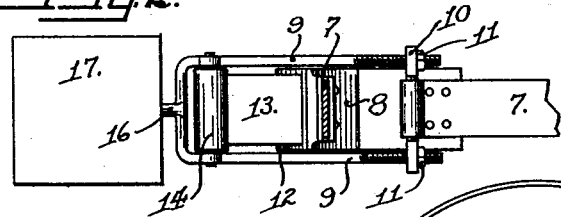
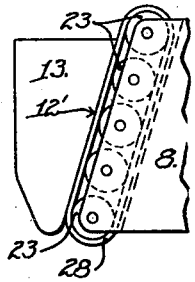
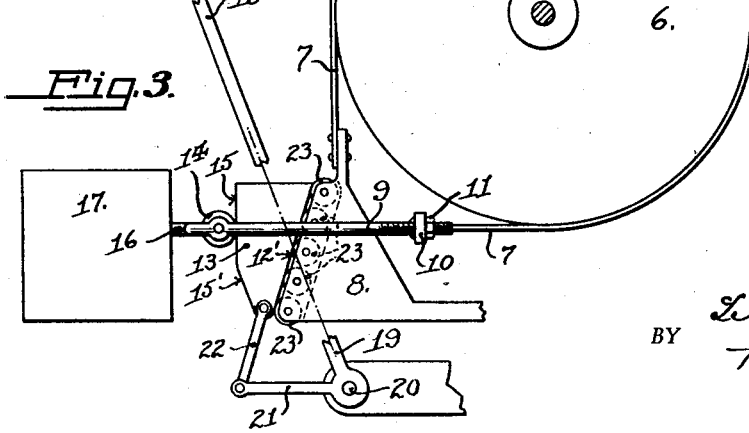
INVENTOR,
Leroy G. Gates
BY Booth & Booth
ATTORNEYS.

Patented Apr. 28, 1931

1,802,810

UNITED STATES PATENT OFFICE

LEROY G. GATES, OF BAKERSFIELD, CALIFORNIA

DRAW-WORKS BRAKE

Application filed May 20, 1930. Serial No. 453,977.

The present invention relates to friction brakes especially adapted for hoisting apparatus. It is described herein as applied to the draw-works of an oil well rig, but its ready adaptation to other forms of apparatus will be apparent to those skilled in the art.

The principal objects of the invention are to provide an adjustable brake which is easy to apply, and which is not subject to kickback of the operating lever upon reversal of the drum, and which cannot be loosened or rendered less effective by such reversal. Other objects and advantages of the invention will be apparent from the following description, which should be read with the understanding that the form, construction and arrangement of the several parts may be varied within the limits of the claims hereto appended, without departing from the spirit of the invention as set forth therein.

The invention will now be described fully with reference to the accompanying drawings, wherein:—

Fig. 1 is a part sectional side elevation of a simple form of brake embodying the principles of my invention.

Fig. 2 is a horizontal section taken on the line 2—2 of Fig. 1.

Fig. 3 is a side elevation showing a modification of one feature of the invention.

Fig. 4 is a detail, partly in section, of the rollers indicated in Fig. 3.

Fig. 5 is a diagrammatic detail showing a further modification of the form of device shown in Fig. 3.

My invention belongs to the type of brakes in which friction is introduced into the movement of the operating mechanism, to assist the leverage of said mechanism in resisting reaction of the braking member, i. e. in preventing kick-back. In the simple form of construction illustrated in Fig. 1, this friction is present while the brake is being applied as well as while it is being released, and results, naturally, in a certain loss of power in the operating mechanism. This form of device is suitable in situations where the maximum necessary braking effect can be produced with the power available (assumed to be the muscular effort of one man) even with the loss of efficiency due to the inherent friction of the operating mechanism. But in modern deep well drilling, the loads handled by the draw-works are so great that the brake, in order to be effective and still be within the ability of one man to operate, must have the maximum efficiency possible. In such cases I prefer the form of device shown in Figs. 3 and 4, in which the friction in the operating mechanism is applied only during the releasing of the brake, and is relieved during the application thereof. In other words, the movement of the operating mechanism is free when applying the brake, but is frictionally impeded during its release. Therefore, the element of safety against kick-back is retained, without the loss of power or efficiency inherent in the first form of construction. Both the means by which friction is applied to the operating mechanism and the braking members themselves may be of any suitable types. I have shown, in both forms of my device, for the sake of illustration, a band type of brake applied to a rotating drum, and a slidable wedge for tightening the band about said drum. In this type of operating mechanism, the friction between the wedge and the member upon which it slides introduces the desired impedance into the operating mechanism.

Referring for the present to Figs. 1 and 2 of the drawings, the reference numeral 6 designates a rotating drum to which the brake is applied, and may be considered, for example, as secured to or formed as a part of the usual draw-works drum. It is surrounded by a band 7, one end of which is anchored to a fixed member 8. The other end of said band is adjustably secured to a U-shaped horizontal yoke 9 by means of a cross piece 10 and nuts 11, the latter threaded upon the legs of the yoke 9.

The fixed member 8, which is straddled by the yoke 9, has an inclined face 12, Fig. 1, upon which slides a wedge block 13. A roller 14, mounted in the yoke 9, bears against the outer face 15 of the wedge 13, so that, as said wedge is moved down, the yoke is shifted to the left, thereby tightening the band 7 about the drum 6. The yoke 9 has an extension 16, which slides in a fixed guide member 17 to prevent vertical movement, and a suitable spring may be provided, as indicated at 18, to keep the roller 14 in contact with the wedge 13. An operating lever 19, fulcrumed at 20, is connected with the wedge 13 in any suitable manner, as by an arm 21 and link 22.

The major portion of the face 15 of the wedge 13 lies substantially at right angles to the direction of movement of the yoke 9, so that downward thrust upon the yoke, in applying the brake, is reduced to a minimum. The lower portion 15' of said face is preferably inclined, as shown, so that the initial movement of the wedge takes up the band more rapidly than the final portion. The adjusting nuts 11 are so set that the band does not grip the drum until the roller 14 begins to ride upon the vertical wedge face portion 15.

It will be seen that with the brake applied and the drum 6 rotating in a clockwise direction, there is comparatively little pull on the yoke 9, but when said drum reverses its rotation, the pull on said yoke is greatly increased. However, by properly designing the angle between the wedge face 12 and the direction of movement of the yoke, it is possible to prevent such increased pull from being transmitted to the lever 19, i. e. to prevent a kick-back, which might be dangerous to the operator. I have found that if the tangent of the angle between the faces 12 and 15 (assuming the face 15 to be perpendicular to the direction of movement of the yoke) is equal to the coefficient of friction between the wedge 13 and the stationary member 8, there is no danger of kick-back.

The above described simple construction, as illustrated in Fig. 1, is suitable when the normal rotation of the drum is clockwise, and when the braking load is moderate. The brake requires considerable effort to apply, because of the friction between the wedge and the face 12 of the member 8, but if the drum reverses while the brake is applied, no additional strain is placed upon the lever 19 or the operator holding it. However, if the normal braking load is very heavy, or if it is desired to apply the brake while the drum is rotating counter-clockwise, the increased effort required to apply the brake may well be beyond the capacity of the operator. In such cases, I prefer the construction shown in Figs. 3 and 4.

In this construction, the principal elements are the same as described above, except that the fixed member 8, instead of having a flat surface upon which the wedge 13 slides, is provided with a plurality of rollers 23, upon which the face 12' of said wedge rolls. These rollers are provided with suitable means for locking them against rotation in one direction. As an example of such means, I have shown, in Fig. 4, a ratchet clutch mechanism comprising an annular flange 24 formed upon the end of the roller 23, and a fixed clutch member 25 positioned within said flange and provided with cam faces 26. Floating rollers 27 are interposed between the flange 24 and said cam faces, so that they jam when the roller 23 attempts to turn in a clockwise direction, i. e. when the wedge 13 moves upwardly, and thus prevent said roller 23 from turning. It turns freely, however, in a counter-clockwise direction. The clutch member 25 may be secured to or formed as a part of the side 8' of the fixed support 8 in which the rollers 23 are mounted. Each of said rollers is understood to be equipped with similar locking mechanism, or, if desired, only one or two rollers may be provided with a locking mechanism, and the entire series inclosed by an endless chain or belt, as indicated at 28, in Fig. 5, against which the wedge face 12' bears.

It will readily be seen that in the form of device shown in Figs. 3, 4 and 5, there is practically no friction to retard the downward movement of the wedge 13, so that the maximum efficiency of the operating mechanism is available in applying the brake, but if the drum reverses, the friction between the wedge and the locked rollers 23 (or the belt or chain 28 of Fig. 5) operates to prevent upward movement of said wedge due to the increased pull of the band, i. e. kick-back is prevented just as effectually as in the form of device shown in Fig. 1. This latter effect is assured, as before, by making the tangent of the angle between the wedge faces 12' and 15 equal to the coefficient of friction between the wedge and the locked rollers 23 (or the belt or chain 28 of Fig. 5). The face 15 is preferably substantially at right angles to the yoke or tension member 9, as in the form of device shown in Fig. 1.

Thus, it will be readily understood, the movement of the operating mechanism is impeded, by friction, in all forms of my invention, upon the releasing of the brake, so that the danger of kick-back upon reversal of the drum is eliminated. This friction also operates, in the form shown in Fig. 1, to impede the operating mechanism in applying the brake, but in the form shown in Fig. 3 there is no impedance to the applying force, and the maximum braking effort can be secured.

I claim:—

1. A brake comprising a moving member; a retarding member; an operating member connected with said retarding member for moving it into contact with said moving member; a wedge having one face bearing against said operating member and movable transversely thereof; a support against which the other face of said wedge bears; and means for decreasing the friction between said wedge and said support in one direction of movement.

2. A brake comprising a moving member; a retarding member; an operating member connected with said retarding member for moving it into contact with said moving member; a wedge having one face bearing against said operating member and movable transversely thereof; a support for receiving the thrust of the other face of said wedge; and means for impeding the movement of said wedge in one direction.

3. A brake comprising a moving member; a retarding member; an operating member connected with said retarding member for moving it into contact with said moving member; a wedge having one face bearing against said operating member and movable transversely thereof; a support; a roller mounted thereon for receiving the thrust of the other face of said wedge; and means for impeding the rotation of said roller in one direction.

4. A brake comprising a moving member; a retarding member; an operating member connected with said retarding member for moving it into contact with said moving member; a wedge having one face bearing against said operating member and movable transversely thereof; a support; a roller mounted thereon for receiving the thrust of the other face of said wedge; and a ratchet mechanism for impeding rotation of said roller in one direction.

5. A brake comprising a moving member; a retarding member; a wedge for moving said retarding member into frictional contact with said moving member; a support movable with said wedge in one direction for receiving the thrust thereof; and means for impeding the movement of said support in the other direction.

6. A brake comprising a moving member; a retarding member; mechanism for moving said retarding member into and out of frictional contact with said moving member; and means for frictionally impeding the operation of said mechanism in one direction only.

7. A brake comprising a moving member; a retarding member; mechanism for moving said retarding member into and out of frictional contact with said moving member; means for frictionally impeding the operation of said mechanism in one direction; and means for rendering said impeding means inoperative in the other direction.

In testimony whereof I have signed my name to this specification.

LEROY G. GATES.